March 21, 1961     O. D. EDWARDS     2,976,253
PROTECTION OF CATALYST
Filed Oct. 10, 1958
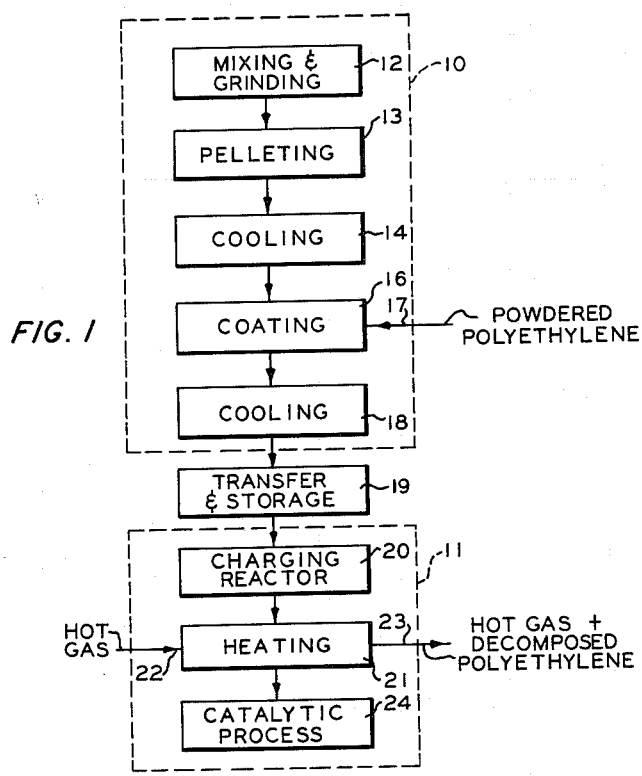
FIG. 1
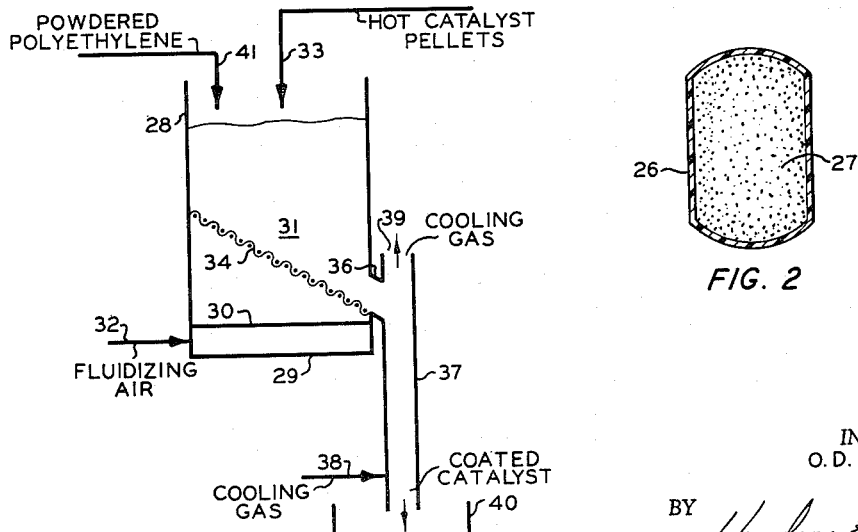
FIG. 2
FIG. 3
INVENTOR.
O. D. EDWARDS
BY Hudson & Young
ATTORNEYS

United States Patent Office 2,976,253
Patented Mar. 21, 1961

2,976,253

PROTECTION OF CATALYST

Oliver D. Edwards, Bartlesville, Okla., assignor to Phillips Petroleum Company, a corporation of Delaware Filed Oct. 10, 1958, Ser. No. 766,451

11 Claims. (Cl. 252—430)

This invention relates to a method of protecting pelleted catalyst from disintegration during handling. In another aspect this invention relates to a pelleted catalyst in a form suitable for handling without danger of attrition. In another aspect this invention relates to a method of protecting a pelleted dehydrogenation catalyst from attrition while preparing the catalyst for use in a dehydrogenation process.

Many catalytic materials such as those used in dehydrogenation, reforming, polymerization or the like, are prepared from finely ground solids and formed into pellets or pills which are used in fixed bed reactors. One of the major problems in connection with pelleted catalysts is their tendency to disintegrate during handling so that the effective surface area of the catalyst is reduced and the pressure drop of fluid passing through the catalyst bed is considerably increased. Dehydrogenation catalysts such as those employed for the conversion of monoolefins to diolefins are particularly subject to attrition during handling. Many of these catalysts are highly hygroscopic and if exposed to the atmosphere for any period of time the pellets will disintegrate. In many instances elaborate handling procedures are required so that the catalyst is protected from the atmosphere during shipping. In addition the reaction chambers must be charged in a minimum amount of time, requiring the coordinated effort of several workers.

According to my invention such problems connected with the handling and transfer of catalytic materials in pelleted form are eliminated. The catalyst can be shipped in bulk, such as in open hopper cars or gondolas, and handled with conventional conveying equipment, i.e., bucket elevators and continuous belts. The catalyst can be charged to reaction vessels at the convenience of other factors involving plant operation without regard to the length of time which the catalyst is exposed to the atmosphere.

Catalyst pellets are protected according to my invention by coating each pellet with a thin film of resinous polymer of one or more olefins, preferably monoolefins having from 2 to 8 carbon atoms per molecule and no chain branching nearer the double bond than the four-position, such as ethylene, propylene, 1-butene, 1-pentene, 1-octene, 1-hexene, 4-methyl-1-pentene, 4-methyl-1-hexene and the like. A catalyst pellet thus coated is protected from the atmosphere so that it cannot absorb moisture. The polymer film also imparts structural rigidity to the pellet to prevent crushing. Catalyst pellets are coated immediately after manufacture, preferably during the final cooling operation. The polyolefin film is removed after the catalyst has been charged to the reaction chambers in which it is to be used by passing a hot gas, above 600° F., over the catalyst, thereby decomposing and removing the polymer. The products of decomposition do not poison the catalyst or reduce its activity.

It is an object of my invention to provide a method of protecting pelleted catalysts from attrition during handling. Another object of my invention is to provide a method of coating catalyst pellets with a thin film of olefin polymer. Still another object is to provide an improved catalyst in pelleted form for shipping and handling purposes. Another object of my invention is to provide a method of coating a catalyst pellet for protection of the catalyst during shipping or handling and removing the coating without interfering with the normal operation of the catalyst. Other objects, advantages and features of my invention will be apparent to those skilled in the art from the following discussion, drawing and claims.

While my invention can be employed to advantage with a number of different types of catalysts which are pelleted, such as reforming catalysts, certain polymerization catalysts and the like, it is of particular importance as applied to dehydrogenation catalysts. The decomposition products of the polyolefin film are hydrocarbons of the general type which normally contact the catalyst in a dehydrogenation process, so that the protective film can be removed by heating without injuring the catalyst. Also, since dehydrogenation processes are ordinarily carried out at high temperatures, for example, about 1050 to 1300° F., no additional step is required to remove the protective film. The coating is decomposed entirely during the initial heating portion of the dehydrogenation cycle so that by the time process temperatures are obtained the protective film is removed and the catalyst is in an operative condition. The preferred dehydrogenation catalysts for use with my invention comprise predominantly iron oxide and potassium carbonate with a small amount of chromium oxide. Such catalysts are useful primarily in the dehydrogenation of butylene to form butadiene, and in the dehydrogenation of methylethylpyridine to form methylvinylpyridine. An example of a commercial catalyst of this type is one containing 62.4 weight percent iron oxide, 35.2 percent potassium carbonate and 2.4 percent chromium oxide. Improved catalysts of this type are now available which contain from 51.0 to 59.0 weight percent potassium carbonate and 39.0 to 47.0 percent iron oxide and from 1.0 to 10.0 percent chromium oxide.

Numerous methods for preparing this catalyst are available. For example, the catalyst components can be brought together in a mill, such as a hammer mill, and milled to break up the agglomerates to small size, the milled mixture pelleted and dried. Alternatively, the catalyst components can be formed into a paste with any suitable liquid, such as water or a dilute tannic acid solution, and extruded into any desired shape or size. Other methods involving coprecipitation, impregnation, and other known methods, can also be used with satisfactory results.

According to one method of preparing commercial dehydrogenation catalysts, the dried iron oxide is admixed with the proper proportions of potassium carbonate and chromium oxide. The mixture is ground twice in a hammer mill to obtain an intimate admixture of ingredients. A small amount of graphite is added to the mixture, after which it is passed through a 28 mesh screen for mixing purposes and formed into ¼" pellets. The material is then ground to a size of 40–100 mesh and formed into ⅛" pellets of 7 pounds strength as determined by exerting force on the side of the tablet. In many cases, the powdered material is heated to drive off moisture before the final pelleting operation. The finished pellets are heated at a temperature below the calcination temperature to afford a final drying; for example, for a period of 16 hours at 1000° F. This also effects at least a partial removal of the graphite.

The catalyst pellets are permitted to cool from their final calcination temperature and it is preferred that the protective film of my invention be applied before the catalyst reaches ambient temperature. The protective film is a normally solid polymer of at least one monoolefin such as polypropylene and is preferably an ethylene polymer, either polyethylene or a copolymer of ethylene with propylene and/or 1-butene. Methods of preparing such polyolefins are available to the art. Polyethylene prepared by the Fawcett process employing extremely high pressures, i.e., over 500 atmospheres, can be used. I prefer, however, for maximum strength of the coated pellet to use a high density polymer prepared by one of the low pressure processes, preferably that described by the patent to J. P. Hogan et al., U.S. 2,825,721. Polymerization processes employing organometallic catalyst systems can also be used. Such processes are described in the copending U.S. applications of H. D. Lyons and Gene Nowlin, Serial No. 495,054, filed March 17, 1955, and J. A. Reid, Serial No. 494,281, filed March 14, 1955, now abandoned. Polymers which are preferred have a density at 25° C. of at least 0.95 gram per cubic centimeter, and a crystalline freezing point of at least 250° F. These high density polymers are quite rigid and have good abrasion resistance so that when coated upon a catalyst pellet, the product has considerable mechanical strength and moisture resistance.

Density determinations should be made on polymer samples which are compression molded at 300° F., cooled to 250° F. over a 10 minute period and then cooled to room temperature in about 8 minutes. The freezing point of crystalline polymers refers to the plateau or inflection point in the cooling curve of the polymer.

Catalyst pellets can be coated with polymer in a fluidized bed or in a cloud chamber, both methods using finely divided solid polymer. Coatings can also be applied by using a solution of polymer in a suitable solvent, applying the solution and evaporating the solvent.

I prefer to coat the catalyst pellets with an ethylene polymer by passing pellets at a temperature in the range of about 380 to 450° F., preferably not over about 425° F., through a fluidized bed of powdered polymer. The pellets can be cooled from their final drying temperature, about 1000° F., to a suitable coating temperature and then passed through the fluidized bed wherein they become coated with a thin film of the polymer which fuses into a continuous coating about each pellet because of the heat in the catalyst. The fluidized bed can have provision for continuous addition of polymer to make up for that which is removed on the catalyst. The hot catalyst pellets are dropped through the bed and removed by suitable means at the lower end of the fluidized bed. A porous plate through which fluidizing gas passes into the polymer bed can be tilted so that the catalyst pellets are directed to a withdrawal conduit. Alternatively, a sloping screen can be positioned in the lower portion of the bed to intercept the coated pellets and direct their removal from the fluidized bed. Since the catalyst pellets are considerably larger and heavier than the particles of polymer which are fluidized, the pellets readily pass through such a bed by gravity without interfering with the fluidized condition of the polymer. The film which is applied to the catalyst pellets should be at least one-half mil in thickness and generally should not exceed 10 mils in thickness for even the largest pellets. Normally the film applied in a fluidized bed coating process will have a thickness of about 1 to 4 mils. The fluidized polymer will be very finely ground, have a screen size of approximately 100 to 140 mesh and the catalyst pellets will ordinarily be spherical or rod-shaped with a maximum dimension of about 1/8 to 1/2 inch. It is best to employ the lowest possible temperature required for the catalyst pellet to fuse an adequate film of polymer on its outer surface so that the catalyst, after coating, can be removed from the bed with a minimum of agglomeration. By controlling the temperature of the gas fluidizing the polymer bed, hot catalyst pellets at about 380–425° F. can be coated immediately upon entering the bed and cooled to about 250° F. by the time they leave the fluidized bed. A cooling step which reduces the temperature of the coated pellets to below 250° F. should be provided before the pellets are permitted to accumulate in a container or otherwise come in contact with each other to any great extent. In this way agglomeration of the coated pellets can be avoided.

The coated catalyst is then transferred to its point of use and is charged to the catalyst chambers where it is employed in the dehydrogenation process. The catalyst is heated to process temperature by passing a hot gas through the catalyst bed. Preferably the hot gas is hydrocarbon and in the dehydrogenation of butene can conveniently be this olefin. When the catalyst reaches about 600° F. the polyolefin film decomposes, breaking down into gaseous products which are removed from the catalyst chamber by the heating gas. By the time process temperatures are reached the protective film has been completely removed from the catalyst pellets so that the catalyst surface is exposed. The dehydrogenation process can then be carried out in a normal manner. Using the catalyst described above, diolefins can be produced from monoolefins, alkenylpyridines from alkylpyridines or alkenyl aromatics from alkyl aromatics.

The dehydrogenation reaction is carried out at high temperature and in the presence of steam. The temperature is ordinarily in the range of 1050 to 1300° F. With temperatures much below 1050° F. the conversion falls off rapidly and with temperatures much above 1300° F., the selectivity of the reaction decreases below the usual desirable limits; however, the catalyst can be employed at both lower and higher temperatures than those indicated. The steam diluent is utilized in the amount of 1 to 20 mols of steam per mol of monoolefin or alkyl aromatic charged. It is advantageous to maintain a pressure as low as feasible, and substantially atmospheric pressure is ordinarily utilized. However, elevated pressures are operable.

Monoolefins most commonly used in producing diolefins of the same number of carbon atoms are butenes and pentenes, butadiene and pentadiene being the products of the process. Also, the dehydrogenation of ethylbenzene to styrene, the dehydrogenation of methylbutene to isoprenes, e.g., 2-methyl-butene to isoprene, and the dehydrogenation of 2-methyl-5-ethylpyridine to 2-methyl-5-vinylpyridine are important applications of the process. The process is applicable generally to monoolefins and diolefins, although monoolefins of 8 or less carbon atoms and alkyl benzenes or alkylpyridines with 1 to 4 alkyl groups each having 6 or less carbon atoms with at least one alkyl group of two or more carbon atoms are most applicable from the standpoint of yield, selectivity and economics.

The process is ordinarily carried out by forming a preheated mixture of the monoolefin and steam, passing the charge mixture over the catalyst at the desired temperature and recovering the product from the reaction mixture coming from the catalyst cases. Recycle of unconverted monoolefin is utilized in substantially all applications. The catalyst chambers may be adiabatic or isothermal, although isothermal reactors are more desirable from a processing standpoint.

Other dehydrogenation catalysts can be used and the invention of coating catalyst pellets with a film of ethylene polymer is of great advantage in preventing attrition. An example of another dehydrogenation catalyst is one which is predominantly iron oxide and contains a small amount of chromium oxide as a stabilizer and a small amount of potassium oxide as a promoter. Another catalyst contains from 10 to 60 weight percent potassium fluoride, 0.2 to 20 percent chromium oxide with the balance iron oxide. Another catalyst contains from 10 to 60 percent potassium chloride and 0.2 to 5 percent chromium chloride with the balance iron chloride. The dehydrogenation of isopentane to isoprene is described in U.S. Patent 2,371,817, and the catalyst employed therein can be employed in my invention. The invention can also be applied to protect catalysts used in the dehydrogenation of methane and of paraffins directly to diolefins. Pelleted reforming catalysts can be protected according to my invention. The majority of these catalysts are platinum-type catalysts and may be supported on alumina, silica-alumina, alumina-titania, alumina-boron oxide, and the like. Other reforming catalysts are promoted with molybdena or palladium and most have minor amounts of halogen constituents. Such catalysts are described in the patent to J. W. Myers et al., U.S. 2,784,162.

To further clarify the disclosure of my invention, reference is now made to the drawing in which Figure 1 is a simplified block flow diagram of the overall process, Figure 2 is a cross-section of a coated catalyst pellet, and Figure 3 is a schematic diagram of a method of coating catalyst pellets in a fluidized bed of polymer.

In Figure 1, the operations enclosed within broken line 10 are part of the catalyst manufacture while those within broken line 11 belong to the use of the catalyst in, for example, dehydrogenation. The catalytic ingredients are pulverized and mixed in step 12 and then compacted into pellets or pills in well-known operations 13. These operations are generally at elevated temperatures or include a final calcining step so that a cooling operation 14 is necessary before coating the pellets with polymer in step 16. When coating in a fluidized bed, powdered polymer 17 is continuously added. After coating a final cooling step 18 is normally desirable to prevent agglomeration of pellets. The catalyst is then ready for storage or transfer 19 without danger of attrition.

When ready for use, the pellets are charged to a dehydrogenation reactor in step 20 and the polymer is removed by heating 21. Hot gases 22 are passed through the catalyst bed until the polymer breaks down and the products of decomposition or combustion are driven off, 23. The catalyst is then ready for use in the catalytic process 24.

The coated catalyst pellet is shown in cross-section in Figure 2. A complete envelope or covering of polymer 26, coats the outer surface of pellet 27 and provides a moisture barrier between the catalytic material and the atmosphere. In addition, the polymeric coating increases the mechanical strength and abrasion resistance of the pellet.

A suitable coating procedure is set forth by Figure 3 which shows a chamber 28 having a plenum 29 and a porous plate 30 which distributes the fluidizing gas over the cross-section of fluidized bed 31. Fluidizing gas, generally air, is fed into plenum 29 through conduit 32. Hot catalyst pellets 33 are dropped into the fluidized bed of finely divided polymer and fall by gravity through the bed until intercepted by screen 34. Screen 34 is sufficiently open that it does not disrupt the fluidized bed but directs the comparatively large pellets to outlet conduit 36. The coated pellets fall through conduit 36 into a rising stream of cooling gas in tube 37. Gas enters tube 37 through conduit 38 and leaves at vent 39. Conduit 36 can carry a star value but preferably the gas pressures are balanced so that the cooling gas does not enter chamber 28 and disrupt fluidized bed 31. The coated pellets thus fall into container 40 for storage. Make-up polymer 41 is added continuously to the fluidized bed.

As a further description of the process by which a catalyst pellet can be coated according to my invention the following example is presented. The reactants, and their proportions, and other specific conditions are presented as being typical and should not be construed to limit the invention unduly.

A fluidized bed of polyethylene is prepared by the process described in the above-mentioned patent to J. P. Hogan et al. The polyethylene has a density of 0.96 gram per cubic centimeter and is powdered, having a particle size such that 60 percent is in the range of 100 to 140 mesh. The polymer bed is 24 inches deep and one foot in diameter. The bed is fluidized with nitrogen at 30 pounds per square inch gauge at a rate of 10 cubic feet per minute. The dehydrogenation catalyst pellets are 3/16 inch in diameter and contain 52.2 percent potassium carbonate, 44.6 percent iron oxide and 3.2 percent chromium oxide. These pellets are cooled immediately after manufacture from a drying temperature of 1000° F. to 380° F. Pellets are then passed through the fluidized bed of polyethylene at a rate of 1000 pounds per hour. Powdered polymer is added continuously to the bed at the rate of 3 pounds per hour. Coated polymer pellets are removed with a continuous film coating each pellet, the film being one mil thick, and cooled to ambient temperature. The coated pellets are thereafter charged to a dehydrogenation reaction chamber in a bed 3 feet deep and 16 feet in diameter. The bed is heated by passing butane at 1000° F. continuously through the bed unit it has reached the temperature of the butane. By this time all of the polyethylene coating the catalyst is decomposed and removed from the catalyst surface. The bed settles approximately ½ inch. Catalyst pellets are completely free of attrition and retain their original size and shape so that catalyst surface area and fluid pressure drop through the catalyst bed is not decreased measurably because of reduction in size of the pellets.

As will be evident to those skilled in the art, various modifications of this invention can be made or followed, in the light of the foregoing disclosure and discussion, without departing from the spirit or scope thereof.

I claim:
1. A method of protecting a pelleted dehydrogenation catalyst from moisture and attrition during handling which comprises coating each catalyst pellet with a thin, continuous film of a normally solid polymer selected from the group consisting of polyethylene and copolymers of ethylene with at least one monoolefin having from 3 to 4 carbon atoms per molecule.

2. A method of protecting dehydrogenation catalyst pellets comprising iron oxide, chromium oxide and potassium carbonate which comprises coating each of said pellets with a film of polyethylene about 0.5 to 10 mils thick.

3. A method according to claim 2 wherein said catalyst pellets are coated while at a temperature of about 380 to 450° F. by passing them through a fluidized bed of finely divided polyethylene.

4. In the manufacture of pelleted dehydrogenation catalyst wherein hot catalyst pellets are formed comprising iron oxide and potassium carbonate, the method of preventing attrition of the catalyst pellets during handling which comprises cooling said catalyst pellets to a temperature in the range of 380 to 420° F., passing said pellets through a fluidized bed of polyethylene powder thereby coating each pellet with a polyethylene film from about 1 to 4 mils thick, and cooling the thus coated pellets to below 250° F.

5. The process of claim 4 wherein said polyethylene has a density at 25° C. of at least 0.95 gram per cubic centimeter and a crystalline freezing point of at least 250° F.

6. A pelleted dehydrogenation catalyst product having improved handling characteristics comprising a catalyst pellet coated with a continuous film of normally solid olefin polymer selected from the group consisting of polyethylene and copolymers of ethylene with at least one monoolefin having from 3 to 4 carbon atoms per molecule.

7. A pelleted dehydrogenation catalyst product having improved handling characteristics comprising a catalyst pellet having a maximum dimension of about ⅛ to ½ inch coated with a polyethylene film about 0.5 to 10 mils thick.

8. A catalyst product according to claim 7 wherein said catalyst comprises iron oxide and potassium carbonate and said polyethylene has a density at 25° C. of at least 0.95 gram per cubic centimeter and a crystalline freezing point of at least 250° F.

9. An improved method of handling a pelleted contact catalyst which comprises coating each catalyst pellet immediately after manufacture and before complete cooling thereof with a thin film of normally solid ethylene polymer, transferring said catalyst pellets thus coated to a reaction chamber, and heating said coated catalyst to above 600° F. by the passage of gas through said chamber thereby decomposing said polymer and removing said film prior to starting the catalytic process.

10. A method according to claim 9 wherein said catalyst is a dehydrogenation catalyst.

11. An improved method of handling pelleted dehydrogenation catalyst comprising iron oxide and potassium carbonate to substantially eliminate attrition of the pellets which comprises cooling the catalyst pellets immediately after manufacture thereof to about 380 to 425° F., passing the thus cooled pellets through a fluidized bed of powdered polyethylene having a density at 25° C. of at least 0.95 gram per cubic centimeter and a crystalline freezing point of at least 250° F. thus coating each of said pellets with a polyethylene film having a thickness of about 1 to 4 mils, further cooling said pellets thus coated to below 250° F. while keeping said pellets in a separated condition to prevent agglomeration, transferring said pellets thus coated to a dehydrogenation chamber, and passing heated gas through said chamber thus heating said pellets to about 600 to 1200° F. and thereby decomposing and removing said polyethylene film before starting the dehydrogenation process.

References Cited in the file of this patent
UNITED STATES PATENTS

| | | |
|---|---|---|
| 2,509,869 | Kirshenbaum | May 30, 1950 |
| 2,540,599 | Segura | Feb. 6, 1951 |
| 2,842,504 | Jones | July 8, 1958 |
| 2,866,790 | Pitzer | Dec. 30, 1958 |